United States Patent [19]
Hawkins et al.

[11] Patent Number: 5,809,339
[45] Date of Patent: *Sep. 15, 1998

[54] STATE MACHINE DESIGN FOR GENERATING HALF-FULL AND HALF-EMPTY FLAGS IN AN ASYNCHRONOUS FIFO

[75] Inventors: Andrew L. Hawkins; Pidugu L. Narayana, both of Starkville, Miss.

[73] Assignee: Cypress Semiconductor Corp., San Jose, Calif.

[*] Notice: The term of this patent shall not extend beyond the expiration date of Pat. No. 5,712,992.

[21] Appl. No.: 567,918

[22] Filed: Dec. 6, 1995

[51] Int. Cl.⁶ .................................................. G06F 12/00
[52] U.S. Cl. ........................................ 395/877; 711/156
[58] Field of Search ................... 365/221, 189.07, 365/189.12; 395/436, 437, 483, 877; 711/109, 110, 156

[56] References Cited

U.S. PATENT DOCUMENTS

| | | | |
|---|---|---|---|
| 4,467,443 | 8/1984 | Shima | 395/416 |
| 4,802,122 | 1/1989 | Auvinen et al. | 365/154 |
| 4,839,866 | 6/1989 | Ward et al. | 365/221 |
| 4,847,812 | 7/1989 | Lodhi | 365/221 |
| 4,864,543 | 9/1989 | Ward et al. | 365/221 |
| 4,875,196 | 10/1989 | Spaderna et al. | 365/238 |
| 4,888,739 | 12/1989 | Frederick et al. | 365/211 |
| 4,891,788 | 1/1990 | Kreifels | 365/49 |
| 4,942,553 | 7/1990 | Daltymple et al. | 364/900 |
| 4,985,867 | 1/1991 | Ishii et al. | 365/221 |
| 5,084,837 | 1/1992 | Matsumato et al. | 395/250 |
| 5,088,061 | 2/1992 | Golnabi et al. | 365/189.01 |
| 5,220,529 | 6/1993 | Kohiyama et al. | 365/189.01 |
| 5,222,047 | 6/1993 | Matsuda et al. | 365/230.03 |
| 5,228,002 | 7/1993 | Huang | 365/221 |
| 5,262,996 | 11/1993 | Shiue | 362/221 |
| 5,265,063 | 11/1993 | Kogure | 365/233 |
| 5,305,253 | 4/1994 | Ward | 365/73 |
| 5,311,475 | 5/1994 | Huang | 365/221 |
| 5,315,184 | 5/1994 | Benhamida | 307/518 |
| 5,317,756 | 5/1994 | Komatsu et al. | 395/800 |
| 5,345,419 | 9/1994 | Fenstermaker et al. | 365/189.04 |
| 5,365,485 | 11/1994 | Ward et al. | 365/221 |
| 5,367,486 | 11/1994 | Mori et al. | 365/189.05 |
| 5,375,092 | 12/1994 | Taniguchi et al. | 365/221 |
| 5,404,332 | 4/1995 | Sato et al. | 365/201 |
| 5,406,273 | 4/1995 | Nishida et al. | 340/825.51 |
| 5,406,554 | 4/1995 | Parry | 370/58.1 |
| 5,412,611 | 5/1995 | Hattori et al. | 365/221 |
| 5,426,612 | 6/1995 | Ichige et al. | 365/220 |

(List continued on next page.)

FOREIGN PATENT DOCUMENTS

| | | |
|---|---|---|
| 0113996 | 5/1989 | Japan . |
| 0676559 | 3/1994 | Japan . |

OTHER PUBLICATIONS

High Speed CMOS 256× 36× 2 Bi-derection FIFO, QS725420A, MDSF–00018–01, Apr. 24, 1995, pp. 1–36.
High–Speed CMOS 4K× 9 Clocked FIFO with Output Enable, QS7244A, MDSF–00008–05, JUn. 6, 1995, pp. 1–12.
High–Speed CMOS 1K× 36 Clocked FIFO with Bus Sizing, QS723620, MDSF–00020–00, Jul. 17, 1995, pp. 1–36.
K. Kittrell, 1K×9X2 Asynchronous FIFOs SN74ACT2235 and SN74ACT2236, Sep. 1995, 1–3,5–9 (p4 is blank).

*Primary Examiner*—Eddie P. Chan
*Assistant Examiner*—Gary J. Portka
*Attorney, Agent, or Firm*—Maiorana & Acosta, P.C.

[57] ABSTRACT

A state machine design which can be used to realize extremely short flag generation delays, also realizing the benefit of having an extremely high MTBF. A set of next state variables are generated from a combination of three previous state variables and three additional inputs representing a logical "OR" of a read half-full and write half-full flag WRH, an external write clock input, and an external read clock input. The next state variables are derived from a product of the previous state variables, a complement signal of the previous state variables, and the signal WRH. The half-full flag is generated using digital logic decoding techniques that manipulate inputs from the three next state variables, a read clock signal and a write clock signal.

20 Claims, 4 Drawing Sheets

U.S. PATENT DOCUMENTS

| | | | |
|---|---|---|---|
| 5,467,319 | 11/1995 | Nusinov et al. | 365/231 |
| 5,471,583 | 11/1995 | Au et al. | 395/250 |
| 5,473,756 | 12/1995 | Traylor | 395/250 |
| 5,490,257 | 2/1996 | Hoberman et al. | 395/427 |
| 5,495,451 | 2/1996 | Cho | 365/221 |
| 5,502,655 | 3/1996 | McClure | 365/221 |
| 5,506,809 | 4/1996 | Csoppenszky et al. | 365/221 |
| 5,506,815 | 4/1996 | Hsieh et al. | 365/230.03 |
| 5,508,679 | 4/1996 | McClure | 340/146.2 |
| 5,513,318 | 4/1996 | van de Goor et al. | 395/185.01 |
| 5,519,701 | 5/1996 | Colmant et al. | 370/60.1 |
| 5,521,876 | 5/1996 | Hattori et al. | 365/221 |
| 5,528,553 | 6/1996 | Saxena | 365/230.01 |
| 5,546,347 | 8/1996 | Ko et al. | 365/221 |
| 5,557,575 | 9/1996 | Lee | 365/221 |
| 5,619,681 | 4/1997 | Benhamida et al. | 395/500 |
| 5,623,449 | 4/1997 | Fischer et al. | 315/200 |
| 5,625,842 | 4/1997 | Dalrymple | 395/842 |

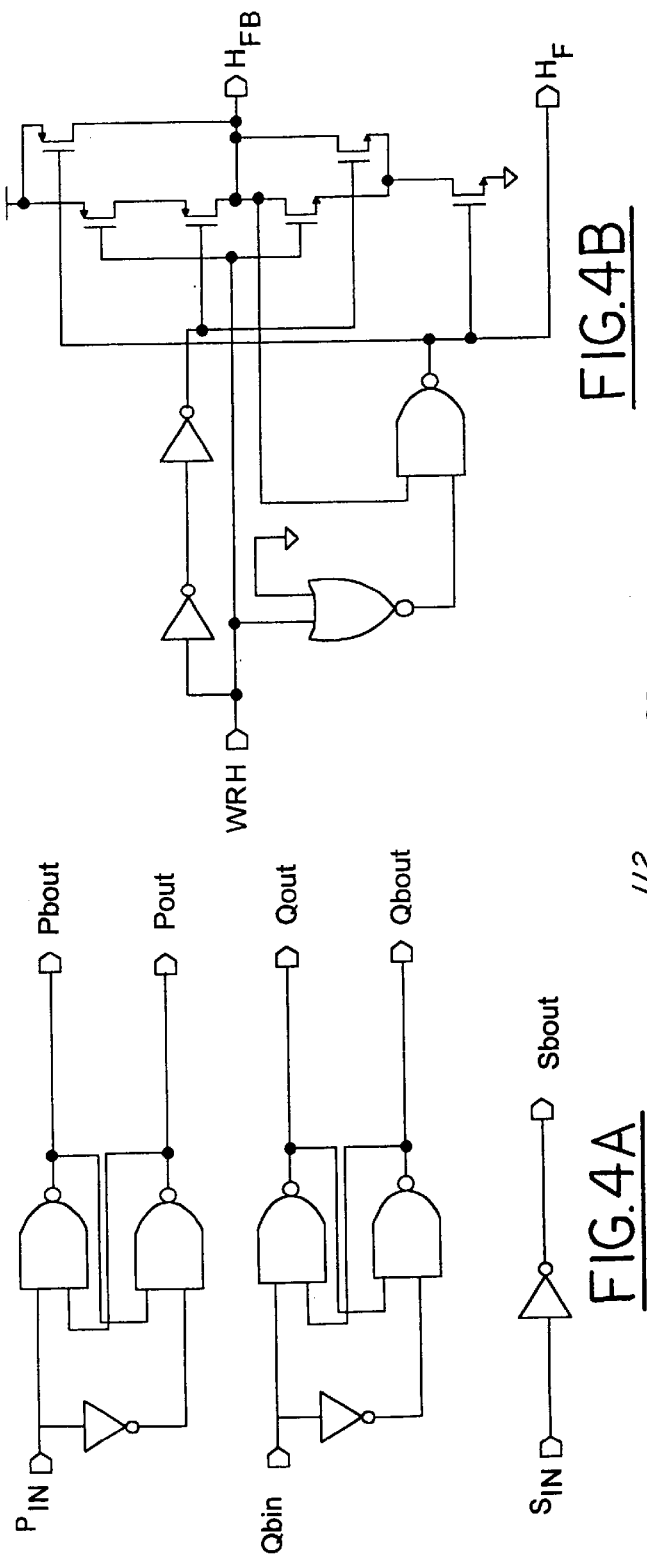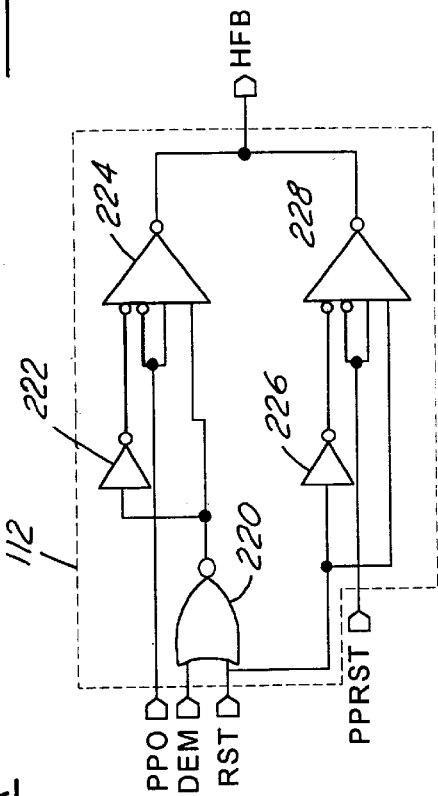
FIG.4A
FIG.4B
FIG.5

STATE MACHINE DESIGN FOR GENERATING HALF-FULL AND HALF-EMPTY FLAGS IN AN ASYNCHRONOUS FIFO

This application may relate to copending applications, U.S. Ser. No. 08/567,893, filed Dec. 6, 1995, now U.S. Pat. No. 5,712,992, U.S. Ser. No. 08/577,712, filed Dec. 12, 1995, U.S. Ser. No. 08/578,209, filed Dec. 29, 1995, U.S. Ser. No. 08/572,623, filed Dec. 14, 1995 and now U.S. Pat. No. 5,627,797, U.S. Ser. No. 08/615,718, filed Mar. 13, 1996 and now U.S. Pat. No. 5,661,418, and U.S. Ser. No. 08/666,751, filed Jun. 19, 1996.

FIELD OF THE INVENTION

This invention relates to FIFO buffers generally and more particularly to a state machine for generating a half-full flag indication when an asynchronous FIFO buffer is half full.

BACKGROUND OF THE INVENTION

It is well known to construct an asynchronous first-in first-out (FIFO) buffer using a comparator technique that uses counters, adders and combinatorial logic to generate a half-full flag indicating the FIFO is half-full. A typical FIFO has both a read and write pointer. The difference between the read and write pointers is computed using an adder and the final half-full flag is generated by performing a magnitude comparison of the adder output with the binary value of FIFO_SIZE/2. A second alternate technique, an evaluation technique, can be used for generating the half-full flag and is implemented by evaluating the expression write_count-read_count-1. The evaluation technique uses the logic state of the bit corresponding to the half-full position(MSB-1'th bit) to represent the half-full flag. A third alternate technique for generating the half-full flag can be implemented by using direct decode logic where an internal half-full and half-full+1 signals are directly decoded from the counters. The half-full (HF) and half-full plus one (HF+1) signals drive set-reset (SR) latch. The output of the SR latch represents the half-full flag.

In the comparator technique, there are two counters, one each for the read and write clocks. These two counters are reset to zero upon master reset and are incremented based on only their respective clocks. The outputs of the read and write counters are fed into a subtractor that calculates the difference between the number of locations written to the FIFO and the number of locations read from the FIFO. This difference is then compared to the magnitude of the binary value representing the half-full count. The output of the magnitude comparator is the half-full flag.

In any FIFO, the write_count-read_count is always less than or equal to the size of the FIFO. This scheme takes advantage of this fact and in the adder stage a 1 is additionally subtracted. From the result of this subtraction the bit value corresponding to the half-full position (MSB-1'th bit) is used with a logic inversion to represent the external half-full flag.

The direct decode technique generates the half-full flag by decoding a write half-full signal when the FIFO is exactly half-full and a read half-full signal when the FIFO is exactly half-full plus one. The write half-full signal and the read half-full signal, together with logic associated to the reset and retransmit functions, set and reset a latch. The output of the latch generates the half-full flag. Even though the direct decode technique is relatively faster ( delays in the magnitude of 15–20 ns) than the comparator technique or the evaluation technique, the direct decode technique suffers from metastability deficiencies and requires fine glitch filters at the input of the latch. Also, the delay in producing the half-full flag is directly related to the density of the FIFO.

The comparator technique and the evaluation technique suffer from long flag delays, while the direct decode technique suffers from metastability deficiencies as well as intensive design requirements. The present invention solves all the problems associated with the various prior art techniques by providing a half-full flag having very high MTBF and very short delays. Additionally the delay associated in producing the half-full flag is independent of the size of the FIFO.

SUMMARY OF THE INVENTION

The present invention provides a state machine design which can be used to realize extremely short flag generation delays. The present invention also realizes the benefit of having an extremely high MTBF. The present invention generates a set of next state variables from a combination of three previous state variables and three additional inputs representing a logical "OR" of a read half-full and write half-full flag WRH, an external write clock input and an external read clock input. The next state variables are derived from a produce of the previous state variables, a complement signal of the previous state variables, and the signal WRH. The half-full flag is generated using digital logic decoding techniques that manipulate inputs from the three next state variables, a read clock signal and a write clock signal.

Objects, features and advantages of the present invention are to provide a state machine that generates a half-full flag for use with an asynchronous FIFO. The state machine has very short flag generation delays that are independent of the size of the FIFO, a design that can be ported to other technologies with minimal effort, a very high MTBF, can handle all of the possible asynchronous clock transitions successfully, requires minimum circuit design and simulation, and does not require latches or monoshots.

BRIEF DESCRIPTION OF THE DRAWINGS

These and other objects, features and advantages of the present invention will be apparent from the following detailed description and the appended claims in which:

FIG. 4A and FIG. 4B are a schematic diagram of the non-overlapping true and complement signal generators;

FIG. 5 is a schematic diagram of the front and output driver of the half-full flag logic.

DETAILED DESCRIPTION OF THE PREFERRED EMBODIMENT

Figure 1:
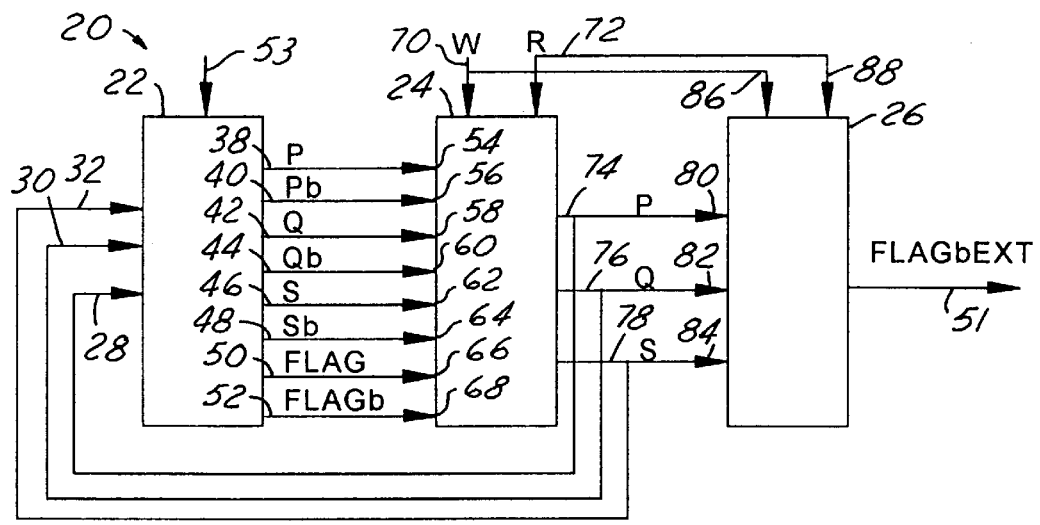
FIG. 1 is a conceptual block diagram representing the overall architecture of the state machine.

Referring to FIG. 1, a conceptual block diagram of a state machine 20 is shown in accordance with a presently preferred embodiment of the invention. FIG. 1 provides a general overview of the functioning of the state machine 20. The detailed workings of the various components are shown in FIGS. 2–8. The state machine 20 generally comprises a signal generator 22, a product generator 24 and a flag decoder 26. The signal generator 22 receives a first input 28, a second input 30 and a third input 32. The first, second and third inputs 28, 30 and 32 correspond to the state variables P, Q and S of the state machine 20. The state variables P, Q and S together represent eight possible states of the FIFO. That is, since each state variable is a digital value (0 or 1), the three variables in combination can represent two to the third, or eight, possible states.

The signal generator 22 has eight outputs 38, 40, 42, 44, 46, 48, 50 and 52. The output 38 represents an unprocessed signal that is equivalent to the state variable P present at the first input 28. The output 40 represents a digital complement Pb of the signal present at the output 38. Similarly, the output 42 represents an unprocessed signal that is equivalent to the state variable Q present at the second input 30. The output 44 represents a digital complement Qb of the signal present at the output 42. The output 46 represents an unprocessed signal that is equivalent to the state variable S present at the third input 32. The output 48 represents a digital complement Sb of the signal present at the output 46. The signal generator 22 also has an input 53 that represents a look-ahead half-full flag WRH. The look-ahead half-full flag WRH is generated by performing a logical OR on a write half-full flag WH and a read half-full flag RH. The look-ahead half-full flag WRH is generated externally to the state machine 20 and internally to the FIFO generally. The output 50 represents an unprocessed signal that is equivalent to the flag WRH. The output 52 represents a digital complement (FLAGb) to the signal present at the output 50.

The write half-full flag WH and the read half-full flag RH are decoded internal flags. The write half-full flag WH equals one when the FIFO is exactly half-full with words and equals zero at other times. Similarly, the read half-full flag equals one when the FIFO is exactly half-full with words plus one. The read half-full flag equals zero at other times. The write half-full flag WH and the read half-full flag RH would be used in the external half-full flag generation in the prior art using an SR latch on the output. The function of the signal generator 22 is to generate equivalent and complement signals of the state variables P, Q and S. The signal generator 22 also provides an equivalent and complement signal FLAG and FLAGb. The signals produced by the signal generator 22 are used by the product generator 24 to produce a set of next state variables P', Q' and S'.

The product generator 24 has eight inputs 54, 56, 58, 60, 62, 64, 66, 68 that are respectively connected to the outputs 38–52 of the signal generator 22. The product generator has a write clock input 70 that receives an external write signal W. The product generator 24 also has a read clock input 72 that receives an external read clock signal R. The product generator 24 processes these inputs 54–72, and provides three outputs 74, 76 and 78 that represent the next state variables P', Q' and S' of the state machine 20.

The flag decoder 26 has inputs 80, 82 and 84 that are respectively connected to the outputs 74, 76 and 78 of the product generator 24. The flag decoder 26 also has a write clock input 86 that receives the external write signal W, as well as a read clock input 88 that receives the external read signal R. The flag decoder 26 can be designed to function without the clock inputs 86 and 88. The flag decoder 26 uses digital logic to produce a half-full flag output signal 51 Flagbext by manipulating the state variables presented at the inputs 80, 82 and 84, as well as the signals presented at the read and write clock inputs 86 and 88.

Figure 2:
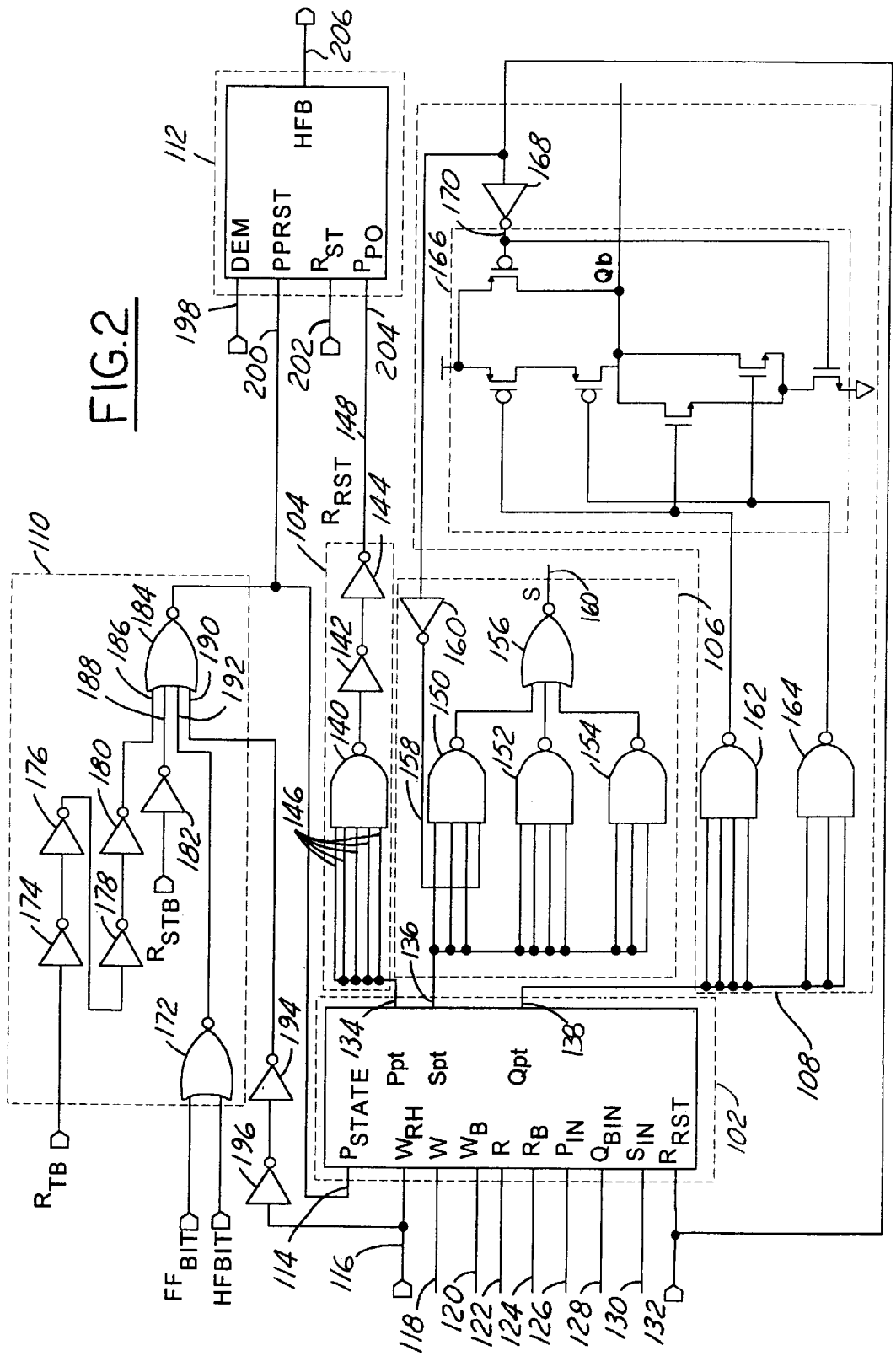
FIG. 2 is a top level schematic of the state machine.

Referring to FIG. 2, a block diagram of a half-full flag generator 100 is shown. The half-full flag generator 100 is shown comprising a front end product generation block 102, a P generation block 104, an S generation block 106, a Q generation block 108, a reset block 110 and a half-full flag driver 112. The front end product generation block 102 has a Pstate input 114, an input 116 that represents the look-ahead half-full flag WRH, an input 118 that represents an external write clock input signal W, an input 120 that represents a digital complement external write clock input Wb, and input 122 that represents an external read clock input R, an input 124 that represents a digital complement external read clock input Rb, a feedback input 126 that represents a state variable P, a feedback input 128 that represents a digital complement to a state variable Qb, a feedback input 130 that represents a state variable S and an input 132 that represents a logic OR of the input Rrst. The front end product generation block 102 processes these inputs, shown in more detail with the description to FIG. 3, and produces an output bus 134 representing the next state variable P', an output bus 136 representing a next state variable S' and an output bus 138 representing a next state variable Q'. Each of the outputs 134, 136 and 138 are multi-bit busses that represent a multi-bit signal presented to the appropriate P, S and Q generation blocks 104, 106 and 108.

After a reset occurs, the half-full flag Hfb will be initialized to a logic 1 (inactive) state. A retransmit feature is implemented allowing the read signal R to be reset to the beginning of the FIFO where data is read from the first location of the FIFO. During the retransmit, the state of the FIFO must be dynamically evaluated based on the number of words written to the FIFO. The P state input 114 represents this dynamic evaluation.

The P generation block 104 receives the output 134 of the front end product generation block 102. The P generation block 104 comprises a NAND gate 140, an inverter 142 and an inverter 144. The NAND gate 140 receives the individual bits of the output bus 134 at five inputs 146. The inverter 142 receives a signal from the NAND gate 140 and presents a signal to the inverter 144. The inverter 144 has an output 148 that represents a signal Ppo.

The S generation block 106 comprises a first NAND gate 150, a second NAND gate 152, a third NAND gate 154 and an XOR gate 156. The first NAND gate 150 receives four inputs from the individual bits of output bus 136. The first NAND gate 150 also receives an input 158 from an inverter 160 that receives the same input as signal 132 of block 102. The second NAND gate 152 receives four inputs from the output bus 136 representing the next state variable S'. The third NAND gate 154 receives three input bits of the output bus 136 representing the next state variable S'. The XOR gate 156 receives an input from each of the first, second and third NAND gates 150, 152 and 154. The NOR gate 156 has an output 161 that represents the state variable S. The output 161 is presented, through a feedback path, to the input 130 of the front end product generation block 102.

The Q generation block 108 comprises a first NAND gate 162, a second NAND gate 164, a transistor block 166 and an inverter 168. The first NAND gate 162 receives four input bits from the output bus 138 representing the next state variable Q'. The second NAND gate 164 receives three input bits from the output bus 138 representing the next state variable Q'. The transistor block 166 receives an input from the first NAND gate 162 and an input from the second NAND gate 164. The transistor block 166 also receives an input 170 from the inverter 168. The inverter 168 receives an input from the Rrst input 132.

The block 110 comprises a NOR gate 172, an inverter 174, an inverter 176, an inverter 178, an inverter 180, an inverter 182 and a NOR gate 184. The inverter 174 receives a retransmit input Rtb. The inverters 174 through 180 are cascaded together and form a first input 186 received by the NOR gate 184. The inverter 182 receives a reset input signal Rstb and provides a second input 188 received by the NOR gate 184. The NOR gate 172 receives an input Ffbit representing a write counter's most significant bit (MSB) and an input HFBIT representing a write counter's most significant bit minus one bit (Msb−1'th bit). The NOR gate 172 has an output that is received by a third input 190 of the NOR gate 184. The NOR gate 184 has a fourth input 192 that receives the look-ahead half-full flag WRH. The look-ahead half-full flag WRH received at the fourth input 192 passes through an inverter 194 and an inverter 196.

The half-full flag driver 112 receives a first input 198 representing a depth expansion mode signal Dem, a second input 200 representing a signal Pprst, a third input signal 202 representing the retransmit input Rtb and a fourth input 204 representing the state variable Ppo received from the output 148. The half-full flag driver 112 has an output 206 that represents the half-full flag Hfb. The signal Dem at the input 198 is a dual functioning input. In a first mode the input 198 presents the half-full flag Hfb. In a second mode the input 198 represents the XO pin. The half-full flag driver 112 either tristates the input 198 or drives it with the signal Hfb.

Figure 3:
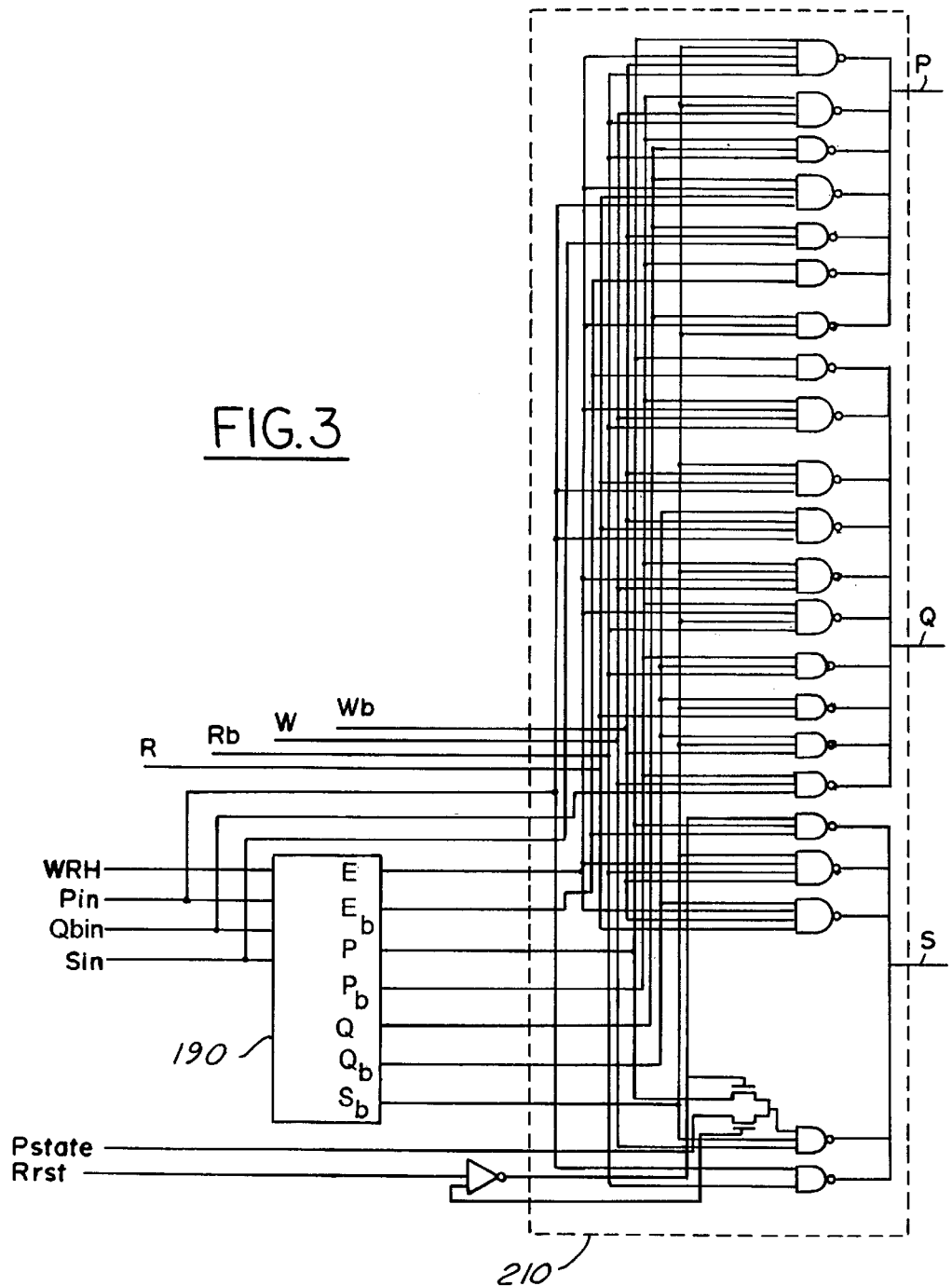
FIG. 3 is a schematic diagram of the front end product generation logic.

Referring to FIG. 3, the internal logic of the front end product generation block 102 is shown. The ten inputs 114–132 of FIG. 2 are shown in FIG. 3. The inputs Wb, W, Rb, and R are received by an array logic block 210. The inputs WRH, Pin, Qbin and Sin are received by a complement generator block 190. The complement generator 190 has outputs E, Eb, P, Pb, Q, Qb and Sb. These outputs are presented to an array logic block 210 along with inputs Wb, W, Rb, R, Pstate and Rrst to produce the output state variables Ppt, Qpt and Spt.

Referring to FIG. 4A and FIG. 4B, the internal logic of the complement generator block 190 is shown. The four inputs Pin, Qbin, Sin and WRH represent the four inputs WRH, Pin, Qbin and Sin of the complement generator block 190 of FIG. 3. The seven outputs Pbout, Pout, Qout, Qbout, Sbout, Hfb and Hf represent the seven outputs E, Eb, P, Pb, Q, Qb and Sb of the complement generator block 190. The outputs of the complement generator block 190 are produced using simple logic gates and transistors as shown in FIG. 4A and FIG. 4B. The logic gates are arranged so that a signal, such as Pout, is never in the active (low) digital state at the same time as the corresponding complement signal, such as Pbout.

Referring to FIG. 5, the half-full flag driver 112 is shown. The inputs Ppo, Dem, Rst and Pprst represent the four inputs as shown in FIG. 2. Similarly the output Hfb represents the output as shown in FIG. 2. The half-full flag driver 112 generally comprises a NOR gate 220, an inverter 222, an enabled inverter 224, an inverter 226 and an enabled inverter 228. The input signal Ppo is received by the the inversion transistors of the enabled inverter 224. The input signal Dem is received by a first input of the NOR gate 220. The input signal Rst is received by a second input of the NOR gate 220, an input of the inverter 226 and a n-enable input of the enabled inverter 228. The output of the NOR gate 220 is received by the inverter 222. The output of the inverter 222 is received by a p-enable input of the enabled inverter 224. The enabled inverter 224 also receives a n-enable input directly from the output of the NOR gate 220. The Pprst signal is received by the inversion transistors of the enabled inverter 228. The inverter 224 and the inverter 228 each have outputs that are combined to form the output Hfb.

Figure 6:
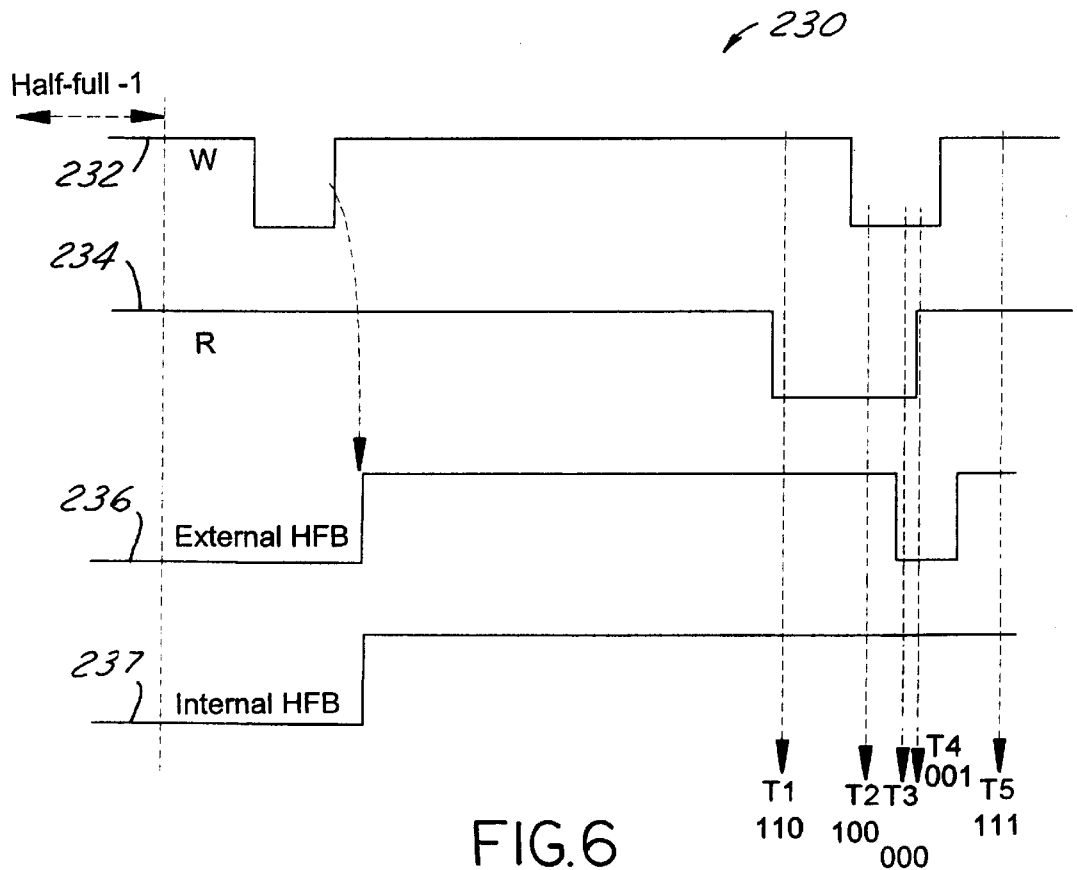
FIG. 6 is a timing diagram showing the response of the state machine for a read signal immediately after entering a half-full state.

Referring to FIG. 6, a timing diagram 230 of the half-full flag generator 100 is shown. The timing diagram 230 represents the response of the half-full flag generator 100 when receiving a read signal R immediately after entering a half-full state. Five transition times are represented as T1, T2, T3, T4 and T5. A first timing wave 232 is shown representing the write signal W (118 in FIG. 2), a second timing wave 234 is shown representing the read signal R (122 in FIG. 2), a third timing signal 236 is shown representing the external half-full flag Hfb (206 in FIG. 2) and a fourth timing signal 237 is shown representing the WRH input (116 in FIG. 2).

The following Table 1 is a flow table or state diagram that illustrates the operation of the half-full flag generator 100:

TABLE 1

| Row | 000 | 001 | 011 | 010 | 110 | 111 | 101 | 100 | HFB |
|---|---|---|---|---|---|---|---|---|---|
| 0 | 0 | 1* | 2 | 3 | 4 | 5 | 6 | 7* | 1 |
| 1 | 0* | 1 | 2* | 3 | 4 | 5 | 6* | 7 | 1 |
| 2 | 0 | 1* | 2 | 3* | — | —* | 6 | 7 | 1 |
| 3 | 0* | 1 | 2* | 3 | —* | — | 6 | 7 | 1 |
| 4 | — | 1 | 2 | —* | 4 | — 21 — | — 6 → | — 15* | 1 |
| 5 | — | 1 | 2* | — | 4* | 5 | 14* | 15 | 1 |
| 6 | 0 | 1* | 2 | 3 | 4 | ↑ 5 — | 6 | 7* | 1 |
| 7 | 0* | 1 | 2 | 3 | 4* | 5 | 6* | 7 | 1 |
| 8 | 8 | 9* | 10 | 11* | — | 13 | 14 | —* | 0 |
| 9 | 8* | 9 | 10* | 11 | — | 13 | 14* | — | 0 |
| 10 | 8 | 9* | 10 | 11* | 12 | 13* | 14 | 15 | 0 |
| 11 | 8* | 9 | 10* | 11 | 12* | 13 | 14 | 15 | 0 |
| 12 | 8 | 9 | — | —* | 12 | 5* | 14 | 31* | 0 |
| 13 | 8 | 9 | 10* | 11 | 12* | 13 | 14* | 15 | 0 |
| 14 | 8 | 9* | 10 | 11 | 12 | 13* | 14 | 15* | 0 |
| 15 | 8* | 9 | — | — | 12* | 5 | 6* ← 15 | 15 | 0 |
| 16 | 16 | — | — | — | — | — | — | — | 1 |
| 17 | — | 17 | — | — | — | — | — | — | 1 |
| 18 | — | — | 18 | — | — | — | — | — | 1 |
| 19 | — | — | — | 19 | — | — | — | — | 1 |
| 20 | — | — | — | — | 20 | — | — | — | 1 |
| 21 | — | 1 | 2* | — | 4* | 5 | 6* | 7 | 1 |
| 22 | — | — | — | — | — | — | 22 | — | 1 |
| 23 | — | — | — | — | — | — | — | 23 | 1 |
| 24 | 24 | — | — | — | — | — | — | — | 0 |
| 25 | — | 25 | — | — | — | — | — | — | 0 |
| 26 | — | — | 26 | — | — | — | — | — | 0 |
| 27 | — | — | — | 27 | — | — | — | — | 0 |
| 28 | — | — | — | — | 28 | — | — | — | 0 |
| 29 | — | — | — | — | — | 29 | — | — | 0 |
| 30 | — | — | — | — | — | — | 30 | — | 0 |
| 31 | 8* | 9 | — | — | 12* | 13 | 14* | 31 | 0 |

The darkened boxes represent the thirty-two stable states of the half-full generator 100, labeled 0 to 31 while the remaining undarkened boxes generally represent the additional possible combinations of the half-full flag generator 100. The left column numbers represent the thirty-two stable states in sequence 1–31. The top row of Table 1 illustrates various possible combinations of three binary signals WRH, W and R. Between each adjacent pairs of columns, one of the signals changes state. For example, column 000 represents the stable states (0, 8, 16 and 24) when WRH, W and R are all 0. The next column illustrates the stable states (1, 9, 17 and 25) when R changes from 0 to 1, and WRH and W remain 0. The next column illustrates the stable states (10, 18 and 26) when W then changes to 1, while R remains 1 and WRH remains zero. The far right column represents the half-full signal HFB.

The arrows inside the Table 1 represent transitions. At a time T1 (FIG. 6), the state machine is in a stable state box 4 (row 4, column 110, meaning that W is one, R is zero and WRH is one as shown in FIG. 6 at time T1). When the write signal complement W goes low at time T2, the state of the machine shifts to the right three columns to row 4, column 100. This is a state that is not stable. Therefore, the state machine shifts to a stable state for that combination which is row 15, column 100. The transition between time T1 and time T2 represents the internal functioning of the half-full flag generator 100. A second transition occurs at time T4 when the R signal goes high in FIG. 6. The half-full flag generator 100 initially transitions in row 15, column 101, and then shifts to a stable state box at row 6, column 101. This represents a second successful transition of the half-full flag generator 100. At time T5 all of the signals are high and the half-full flag generator 100 transitions to the left one column to row 6 column 111, and then adjusts to a stable state at row 5, column 111.

The following Table 2 represents the logic the half-full flag generator 100 uses to decode the half-full flag HFB after a retransmit:

TABLE 2

| Write Counter MSB FF Bit | Write Counter MSB-1 HF Bit | WH | RH | W clock | R clock | FIFO State |
|---|---|---|---|---|---|---|
| 1 | 0 | 0 | 0 | 1 | 1 | Full |
| 0 | 1 | 0 | 0 | 1 | 1 | >HF |
| 0 | 1 | 1 | 0 | 1 | 1 | =HF |
| 0 | 0 | 0 | 0 | 1 | 1 | <HF |

The table shows as row headings a full flag bit FFbit, a half-full bit HFbit, a write half-full flag WH, a read half-full flag RH, an external write clock signal W, an external read clock R and a FIFO state. The legend below the FIFO state indicates when the FIFO will be either full, greater than half-full>HF, equal to half-full=HF less than half-full<HF.

From the foregoing it would be apparent to one skilled in the art that the flag generator 100 produces the output 206 in an efficient manner. The flag generator 100 performs pre-processing steps through blocks 100–110 and the driver 112. The preprocessing occurs prior to the changing of the flag WRH so that the output 206 reflects the changes with minimum delay.

It should be appreciated that while the present invention has been described with respect to a half-full flag, the present invention can also be used to generate a full flag or an empty flag by changing the input received by the look-ahead half-full flag WRH.

It is to be understood that modifications to the invention might occur to one skilled in the field of the invention within the scope of the appended claims.

We claim:

1. An apparatus for generating an output flag that represents the fullness of a FIFO buffer, said apparatus comprising:

signal generator means having a first set of inputs creating a digital word indicating the current state of a FIFO and a flag input receiving a look-ahead flag representing a particular fullness characteristic of said FIFO, said signal generator means manipulating said inputs to create a first set of outputs representing the first set of inputs, a second set of outputs representing a digital complement to the first set of inputs, and a third set of outputs representing the look-ahead flag and a digital complement of the look-ahead flag;

product generator means having a first set of inputs connected to the first, second and third set of outputs of the signal generator means, said product generator means manipulating said first set of inputs to produce a set of outputs representing the current state of the FIFO; and flag decoder means having a set of decoder inputs connected to the set of outputs of the product generator, said flag decoder means manipulating the set of decoder inputs to create an output flag that is at one logic state when the FIFO is at said particular fullness characteristic and is at another logic state when the FIFO is not at said particular fullness characteristic.

2. The apparatus according to claim 1 wherein said look-ahead flag is programmable to represent a different particular fullness characteristic of said FIFO.

3. The apparatus according to claim 1 wherein said product generator means further comprises at least one pair of timing inputs connected to an external write clock and an external read clock; said product generator means manipulating said timing inputs in combination with said first set of inputs and said flag input to produce said set of outputs.

4. The apparatus according to claim 1 wherein said flag decoder means further comprises at least one pair of timing inputs connected to an external write clock and an external read clock, said flag decoder means manipulating said first pair of inputs in combination with said decoder inputs to produce said output flag.

5. The apparatus according to claim 1 wherein said signal generator means further comprises a set of cross-coupled gates connected between said first set of inputs and said first and second sets of outputs of said signal generator means, said set of cross-coupled gates for insuring that said first set of outputs and said second set of outputs are not in an active digital state at the same time.

6. The apparatus according to claim 5 wherein each of said cross coupled gates comprises a first NAND gate and a second NAND gate, each of said NAND gates having a first and second input and an output, each of the first inputs of the first and second NAND gates connected to a signal from said first set of inputs of said signal generator means, the output of said first NAND gate provides a signal to the first set of outputs of the signal generator means and is coupled to the second input of the second NAND gate, the output of the second NAND gate provides a signal to the second set of outputs of the signal generator means and is coupled to the second input of the first NAND gate.

7. The apparatus according to claim 6 wherein each of said cross coupled gates further comprises an inverter connected between said signal from said first set of inputs and said first input of said second NAND gate.

8. The apparatus according to claim 1 wherein said product generator means further comprises an array of logic gates.

9. The apparatus according to claim 1 wherein said set of outputs representing the current state of the FIFO comprises three variables P, Q and S.

10. The apparatus according to claim 9 wherein said variables P, Q and S represent eight possible states of the FIFO, said flag decoder means produces said output flag in response to the eight possible states of the FIFO.

11. An apparatus for generating a half-full flag that represents the fullness of a FIFO, said apparatus comprising:

product generation means responding to a set of product inputs creating a digital word indicating a current state of the FIFO, said product generation means manipulating said set of product inputs to produce a set of product outputs representing a next state of the FIFO;

state generation means responding to a set of state inputs connected to said set of product outputs, said state generation means manipulating said set of state inputs to produce a set of state outputs representing the current state of the FIFO, said set of state outputs being presented to said set of product inputs of said product generation means; and flag driver means having a half-full flag output, a first flag driver input connected to one of said state outputs and a second flag driver input connected to a reset input, said flag driver means manipulating said first and second flag driver inputs to create said half-full flag output that is at a first digital state when said FIFO is half-full and is at a second digital state when said FIFO is not half-full.

12. The apparatus according to claim 11 wherein said state generation means further comprises:

P generation means for producing a first one of said state outputs;

Q generation means for producing a second one of said state outputs; and

S generation means for producing a third one of said state outputs.

13. The apparatus according to claim 11 further comprising reset means having a first reset input receiving an external retransmit signal, a second reset input receiving a MSB signal of a write counter, a third reset input receiving a MSB−1 signal of said write counter and a reset output connected to said flag driver means.

14. The apparatus according to claim 13 wherein said reset means further comprises a first NOR gate having a first input receiving said MSB signal of said write counter and a second input receiving said MSB−1 signal of said write counter and an output.

15. The apparatus according to claim 14 wherein said reset means further comprises a second NOR gate having a first input receiving the output of said first NOR gate, a second input receiving said external retransmit signal and a third input receiving an external reset input, said second NOR gate producing said reset output.

16. The apparatus according to claim 15 wherein said second NOR gate further comprises a fourth input receiving a WRH signal representing a logical OR of an externally generated read half-full flag and an externally generated write half-full flag.

17. The apparatus according to claim 12 wherein said P generation means further comprises:

a NAND gate having an output and a set of inputs for receiving each one of said state outputs of said state generation means;

a first inverter having an output and an input receiving said output of said NAND gate; and a second inverter having an input receiving said output of said first inverter and an output representing said first one of said state outputs.

18. The apparatus according to claim 12 wherein said Q generation means further comprises:

a first NAND gate having an output and a set of inputs for receiving each one of said state outputs of said state generator means;

a second NAND gate having an output and a set of inputs for receiving each one of said state outputs of said state generator means;

a third NAND gate having an output and a set of inputs for receiving each one of said state outputs of said state generator means; and a NOR gate having a first input receiving the output of the first NAND gate, a second input receiving the output of the second NAND gate, a third input receiving the output of the third NAND gate and an output representing the second one of said state outputs.

19. The apparatus according to claim 12 wherein said S generation means further comprises:

a first NAND gate having an output and a set of inputs for receiving each one of said state outputs;

a second NAND gate having an output and a set of inputs for receiving each one of said state outputs;

logic means having a first and second input receiving said outputs of said first and second NAND gates and an output representing the third one of said state outputs.

20. The apparatus according to claim 11 wherein said product generation means comprises an array of logic gates.

* * * * *